United States Patent [19]

Wagner

[11] 4,447,379

[45] May 8, 1984

[54] PRODUCTION OF CERAMIC LITHIUM NITRIDE

[75] Inventor: Armin Wagner, Laubach, Fed. Rep. of Germany

[73] Assignee: Varta Batterie Aktiengesellschaft, Hanover, Fed. Rep. of Germany

[21] Appl. No.: 366,858

[22] Filed: Apr. 9, 1982

[30] Foreign Application Priority Data

Nov. 6, 1981 [DE] Fed. Rep. of Germany ....... 3123094

[51] Int. Cl.³ ............................................. B29H 7/20
[52] U.S. Cl. ....................................... 264/61; 264/65; 264/332
[58] Field of Search ................... 264/60, 65, 332, 85, 264/61; 501/96; 423/409

[56] References Cited

U.S. PATENT DOCUMENTS 2,866,685 12/1958 Lam .................................... 423/409

FOREIGN PATENT DOCUMENTS 2750607 5/1979 Fed. Rep. of Germany ...... 423/409

Primary Examiner—John Parrish
Attorney, Agent, or Firm—Weiser, Stapler & Kimmelman

[57] ABSTRACT

To produce ceramic lithium nitride as solid electrolyte for galvanic lithium cells, $Li_3N$ powder is first stirred together with molten Li-metal serving as binder, in a noble gas atmosphere. After cooling, the mixture is pressed into a shaped body and the shaped body is then sintered in nitrogen at temperatures of about 700° C. This causes the Li-binder to also become transformed into $Li_3N$. The binding with lithium also makes the powdery starting material suitable for rolling, and shaped bodies such as tablets can be cut out of the ductile rolled product with high precision.

12 Claims, No Drawings

PRODUCTION OF CERAMIC LITHIUM NITRIDE

The invention relates to a method of producing ceramic lithium nitride, particularly for use as solid electrolyte in galvanic lithium cells.

The particular suitability of lithium nitride as solid electrolyte in solid lithium cells, or as separator in cells with liquid lithium, is due to its high Li+ ion conductivity and its adequate stability in relation to elementary lithium. Of course, all air and moisture must be strictly excluded.

Lithium nitride can be obtained and used both as single crystal and in polycrystalline form.

From German Patent publication (Offenlegungsschrift) No. 27 50 607 it is known to produce ceramic bodies from polycrystalline $Li_3N$ powder through pressing under high pressure, and sintering. However, this process reaches its limits when the progressive miniaturization, e.g. for electronic wristwatches, requires exceptionally small or flat structural elements.

Thus the height of a $Li_3N$ solid electrolyte tablet, for example, may be only a few tenths of a millimeter. Such a tablet cannot be pressed from commercial $Li_3N$ because it has been found that the powder remains partially stuck to the compression ram, and thereby creates tablets with irregular, mainly dish-shaped craters.

Accordingly it is an object of the invention to provide a method of manufacturing lithium nitride sintered ceramic in a manner which avoids the above mentioned problem in shaping the starting material.

This and other objects which will appear are achieved in accordance with the invention by compressing the cooled mixture into a shaped body, or by rolling it, and by then sintering the shaped body in a nitrogen stream.

It is particularly desirable to add, for stirring, one part by weight of Li-metal, to two parts by weight of $Li_3N$.

The mixture is appropriately prepared in a molybdenum or tungsten crucible, at a temperature of about 200° C.—Li melts at 180° C. After complete homogenizing, cooling is permitted, and the mixture is compressed into the desired tablet shape at a pressure between 1 and 10 kbar, preferably about 5 kbar. All operations are performed in a noble gas, e.g. argon.

The shaped bodies so obtained, but not yet finished—also known as greenlings —differ from compressed $Li_3N$ tablets of conventional kind by their defect-free surfaces, which show no traces of torn out material, even for layer thicknesses below 0.3 mm.

Evidently, the adhesion forces which otherwise operate in the boundary surface region between tablet surface and compression ram, are overcome by the cohesion force of the elementary lithium which is present. The material compressed in accordance with the invention is ductile and is easily workable. The Li-binder even makes it possible to roll the starting mixture emboding the invention, and to cut from the rolled product small tablets or other shaped bodies with precision. This can yield substantial advantages in the manufacture of masses.

For further processing, the greenlings are then transferred to molybdenum boats, in which they are placed into a tubular oven, and then subjected to sintering in a nitrogen stream at temperatures between 550° and 770° C., perferably at 700° to 750° C. In so doing, it is desirable to heat the oven initially for a period of one hour only to temperatures between 130° and 170° C., preferably to 150° C. By this temperature treatment, the reaction of the Li with the nitrogen is initiated. The actual sintering process requires about 1½ hours.

The cooled end product is of uniformly gray-brown color.

Investigations of conductivity have shown that this is the same for $Li_3N$ produced according to the invention, as for conventionally produced $Li_3N$ ceramics.

The Li additive to the $Li_3N$ powder embodying the invention does not perform only the function of a binder, but also constitutes a particularly desirable sinter aid. This is because the molten Li provides good contact between $Li_3N$ grains and assumes their crystalline structure during nitriding. The $Li_3N$ grains which are present act as crystallization nuclei and thereby promote the reaction. The binder changes into the transformation product which is actually wanted. Since pure $Li_3N$ has an X-ray density of 1.34 $g/cm^3$, whereas Li has one of only 0.53 $g/cm^3$, the sintering process is also accompanied by a contracting effect of the binding medium upon the $Li_3N$ grains, since the voluminous Li undergoes a chemical densification through reaction with the nitrogen. In galvanic lithium cells it is desired that the solid electrolyte be just as dense as possible, i.e. a pore-free sinter body. The terminal density of about 1.2 $g/cm^3$ achieved by the sinter process differs only relatively slightly from the ideal X-ray density.

I claim:

1. A method of producing ceramic lithium nitride, particularly for use as solid electrolyte in galvanic lithium cells, comprising
   stirring $Li_3N$ powder together with molten Li-metal in a noble gas atmosphere, permitting the mixture to cool
   compressing the cooled mixture into a shaped body, and
   sintering the shaped body in a nitrogen stream.

2. The method of claim 1 wherein the mixture relationship between $Li_3N$ powder and molten Li-metal is about 2:1.

3. The method of claim 1 wherein the compression pressure is between 1 and 10 kbar.

4. The method of claim 3 wherein the pressure is approximately 5 kbar.

5. The method of claim 1 wherein the shaped body sintered for about 1½ hours at 550° to 770° C.

6. The method of claim 5 wherein the sintering is at 700° to 750° C.

7. The method of claim 1 wherein the shaped body is tempered before sintering for about one hour at 130° to 170° C.

8. The method of claim 7 wherein the shaped body is tempered at about 150° C.

9. A method of producing lithium nitride bodies, comprising stirring $Li_3N$ powder together with molten Li-metal in an inert gas atmosphere permitting the mixture to cool and then compressing the cooled mixture into a shaped body.

10. The method of claim 9 wherein the mixture relationship between $Li_3N$ powder and molten Li-metal is about 2:1.

11. The method of claim 9 wherein the compression pressure is between 1 and 10 kbar.

12. The method of claim 1 wherein the compressing is by rolling.

* * * * *